US 12,504,848 B2

(12) United States Patent
Jeon et al.

(10) Patent No.: US 12,504,848 B2
(45) Date of Patent: Dec. 23, 2025

(54) TOUCHSCREEN DISPLAYS

(71) Applicant: STMicroelectronics Asia Pacific Pte Ltd., Singapore (SG)

(72) Inventors: Sang Hoon Jeon, Seoul (KR); Myung Hyun Hwang, Gyeonggi-Do SeongNam (KR); Sang Soo Lee, Seoul (KR)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 23 days.

(21) Appl. No.: 18/643,358

(22) Filed: Apr. 23, 2024

(65) Prior Publication Data

US 2024/0272745 A1 Aug. 15, 2024

Related U.S. Application Data

(62) Division of application No. 17/456,832, filed on Nov. 29, 2021, now Pat. No. 11,995,267.

(51) Int. Cl.
*G06F 3/041* (2006.01)
*G06F 3/0354* (2013.01)
*G09G 3/00* (2006.01)
*G09G 3/3233* (2016.01)

(52) U.S. Cl.
CPC .... *G06F 3/041662* (2019.05); *G06F 3/03545* (2013.01); *G06F 3/04162* (2019.05); *G09G 3/035* (2020.08); *G09G 3/3233* (2013.01); *G06F 2203/04102* (2013.01); *G09G 2300/0842* (2013.01); *G09G 2310/08* (2013.01); *G09G 2320/0247* (2013.01); *G09G 2354/00* (2013.01)

(58) Field of Classification Search
CPC ........... G06F 3/041662; G06F 3/03545; G06F 3/04162; G06F 2203/04102; G06F 3/0412; G06F 3/0446; G06F 3/04184; G06F 3/04166; G09G 3/035; G09G 3/3233; G09G 2300/0842; G09G 2310/08; G09G 2320/0247; G09G 2354/00

See application file for complete search history.

(56) References Cited

U.S. PATENT DOCUMENTS

| | | |
|---|---|---|
| 9,318,072 B2 | 4/2016 | Cha et al. |
| 9,318,726 B2 | 4/2016 | Choi et al. |
| 10,019,968 B2 | 7/2018 | Bi et al. |
| 10,170,049 B2 | 1/2019 | Ryu et al. |

(Continued)

FOREIGN PATENT DOCUMENTS

KR 20110101683 A 9/2011

*Primary Examiner* — Temesghen Ghebretinsae
*Assistant Examiner* — Ivelisse Martinez Quiles
(74) *Attorney, Agent, or Firm* — Slater Matsil LLP

(57) ABSTRACT

An embodiment method for operating an electronic device includes transmitting, from a controller, a tearing effect (TE) signal to a touchscreen over a first period of time, the first period of time occurring during a first frame and having a duration that is shorter than a period of the first frame, the TE signal being configured to restrict image data from being displayed on the touchscreen during the first period of time; displaying the first frame of a plurality of frames of the image data on a display of the touchscreen over a second period of time within the period of the first frame other than during the first period of time; and detecting, at the controller, a first touch by performing a first self-sensing scan during the first period of time.

20 Claims, 8 Drawing Sheets

(56) References Cited

U.S. PATENT DOCUMENTS

| | | |
|---|---|---|
| 10,186,194 B2 | 1/2019 | Fujii |
| 10,204,565 B2 | 2/2019 | Park et al. |
| 2014/0071062 A1 | 3/2014 | Fang |
| 2015/0185937 A1 | 7/2015 | Lee |
| 2017/0024077 A1* | 1/2017 | Lin .................... G06F 3/04184 |
| 2018/0348931 A1 | 12/2018 | Kim et al. |
| 2019/0086961 A1 | 3/2019 | Hsu |
| 2019/0102021 A1 | 4/2019 | Jang et al. |
| 2019/0102030 A1* | 4/2019 | Kakinoki .............. G06F 3/0446 |
| 2019/0171320 A1 | 6/2019 | Kim et al. |
| 2021/0200366 A1* | 7/2021 | Bok ...................... G06V 10/17 |
| 2021/0248980 A1 | 8/2021 | Lee et al. |
| 2022/0093694 A1 | 3/2022 | Park et al. |

\* cited by examiner

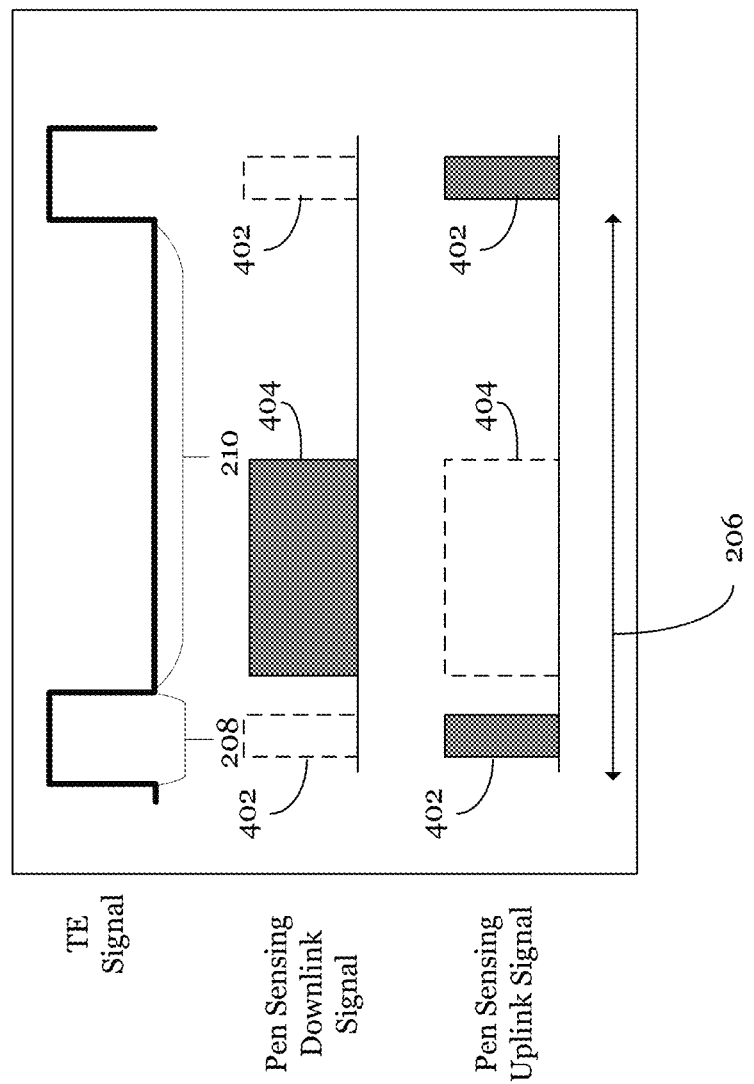

TOUCHSCREEN DISPLAYS

CROSS-REFERENCE TO RELATED APPLICATIONS

This application is a divisional of U.S. application Ser. No. 17/456,832, filed on Nov. 29, 2021, which application is hereby incorporated by reference herein in its entirety.

TECHNICAL FIELD

The present invention relates generally to systems and methods for operating displays, and in particular embodiments to touchscreen displays.

BACKGROUND

Electronic devices that are designed for user interaction have historically utilized external input devices such as keyboards, key pads, and/or mice to capture user input. In recent years, there has been a push from the more traditional methods, as consumers prefer the convenience of portable devices that can support a more flexible lifestyle. To this end, there has been a rise in smaller, portable, hand-held electronic devices, such as mobile phones, tablets, gaming systems, etc. This has given rise to the popularity of touch screens and touch panel displays as systems for capturing user input. Not only do they provide the functionality of the traditional electronic devices, but touchscreens provide additional features. For example, given the appropriate software, users are able to utilize touchscreens for sketching, drawing, and various hand writing applications.

Organic light emitting diodes (OLEDs) offer a higher performance display. With the increasing use of OLED displays, thinner OLED displays that are flexible and/or foldable are emerging as a way to increase the size of a display without increasing the size of the device.

However thinner OLED displays come with their own set of advantages and disadvantages. A display panel of an OLED based touchscreen may include a plurality of pixels arranged in rows and columns across a display layer in a matrix like formation. Each pixel may include an OLED configured to generate light based on the current driven through it. However, when sensing scans to detect touch are performed on the touchscreen, an additional current draw may be required. This may reduce the current driven through the OLEDs, which may dim the screen and result in display flicker. As OLED displays are becoming thinner, display flicker is becoming increasingly noticeable. In other words, even small changes in the current flow through the OLEDs may cause a noticeable display flicker.

SUMMARY

In an embodiment, a method for operating an electronic device includes transmitting, from a controller, a tearing effect (TE) signal to a touchscreen over a first period of time, the first period of time occurring during a first frame and having a duration that is shorter than a period of the first frame, the TE signal being configured to restrict image data from being displayed on the touchscreen during the first period of time; displaying the first frame of a plurality of frames of the image data on a display of the touchscreen over a second period of time within the period of the first frame other than during the first period of time; and detecting, at the controller, a first touch by performing a first self-sensing scan during the first period of time.

In an embodiment, a method for operating an electronic device includes: generating a blank period of time in which a touchscreen is restricted from displaying an image in each of a plurality of frames, the blank period of time being shorter than a period of each of the plurality of frames; performing a vertical synchronization of the touchscreen during the blank period of time; and displaying an image in each of the plurality of frames, a brightness of the image in each of the plurality of frames before and during the blank period of time being maintained by restricting a time duration for additional current draw for a self sensing-scan to fall within the blank period of time.

In an embodiment, a device includes: a touchscreen; a controller; a memory for storing a program to be executed in the controller, the program including instructions when executed cause the controller to: transmit a tearing effect (TE) signal from the controller to the touchscreen over a first period of time, the first period of time occurring during a first frame and having a duration that is shorter than a period of the first frame, the TE signal being configured to restrict image data from being displayed on the touchscreen during the first period of time; display the first frame of a plurality of frames of the image data on a display of the touchscreen over a second period of time within the period of the first frame other than during the first period of time; and detect a first touch by performing a first self-sensing scan during the first period of time.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1A-1F illustrate an electronic device configured to prevent display flicker according to an embodiment of the present application, wherein FIG. 1A illustrates a component schematic of the electronic device, FIG. 1B illustrates a component schematic of a touchscreen, FIG. 1C illustrates a component schematic of a display stack up of the touchscreen, FIG. 1D illustrates a schematic of an OLED layer of the touchscreen, FIG. 1E illustrates a schematic of an example pixel driving circuit of the OLED layer, and FIG. 1F illustrates a component schematic of a touch sensitive layer of the electronic device;

FIG. 4 illustrates a timing diagram for preventing flicker on a touchscreen for a touchscreen in communication with an active stylus pen according to an embodiment of the present application.

DETAILED DESCRIPTION OF ILLUSTRATIVE EMBODIMENTS

While OLED touchscreens have led to great advances in the evolution of portable devices, limitations still exist.

Conventional organic light emitting diode (OLED) devices may include a display panel that may include a plurality of pixels arranged in rows and columns across a display layer in a matrix like formation. Each pixel may include an OLED configured to generate light based on the current driven through it.

Conventional OLED devices control the image displayed by controlling the current flowing across each of the OLEDs. The intensity of the brightness of the light illuminated by each OLED is dependent on the current driven through it. Problematically, however, when sensing scans, such as self-sensing scans and mutual sensing scans are performed to detect touch on the touchscreen, their additional current draws (i.e. required energy) may reduce the current flowing through OLEDs. In such cases, especially as OLED touchscreens are becoming thinner, this may result in a dimming of the light illuminated by the OLEDs and result in noticeable display flicker.

Embodiments of the present application relate to a method for preventing display flicker of an electronic device. Particular embodiments of the present application relate to a method for preventing display flicker of an electronic device by performing a self-sensing scan to detect user touch during a blank time when pixels on the OLED touchscreen are not being driven.

Figure 1A:
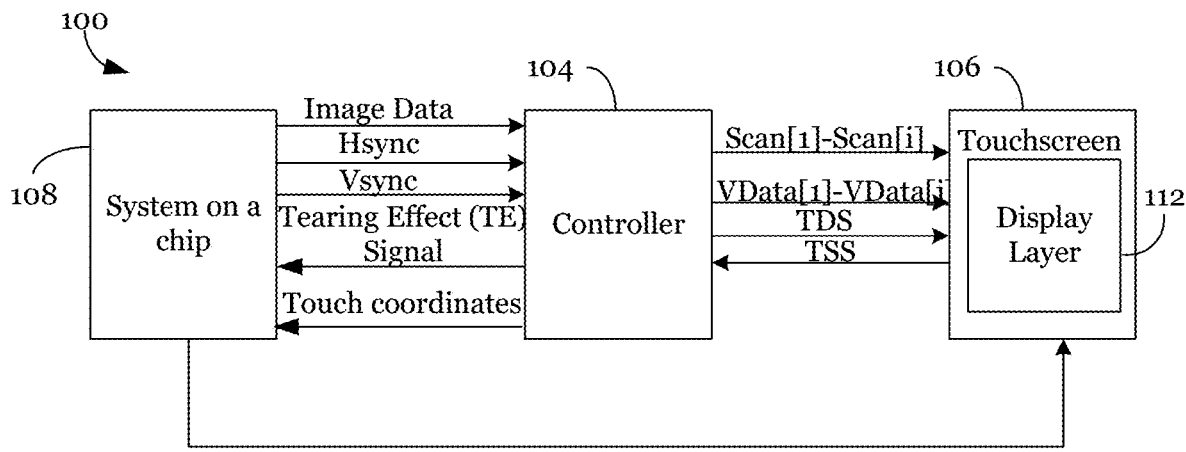
Figure 1B:
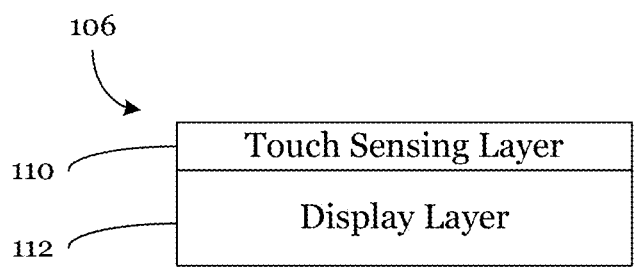
Figure 1C:
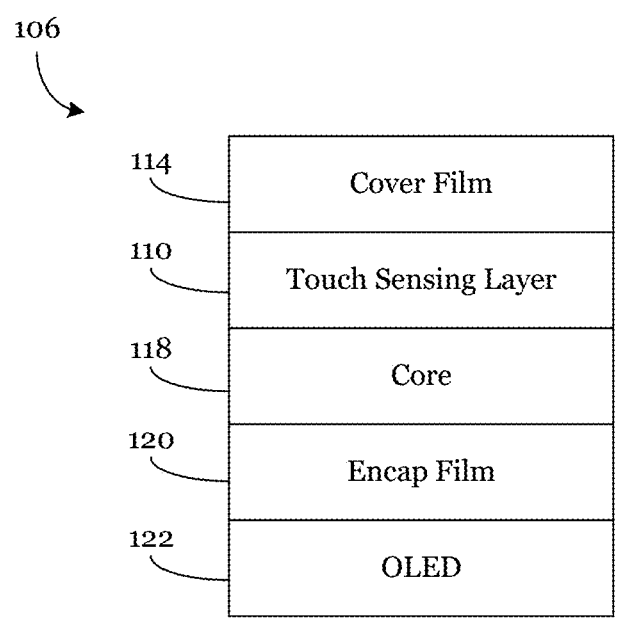
Figure 1D:
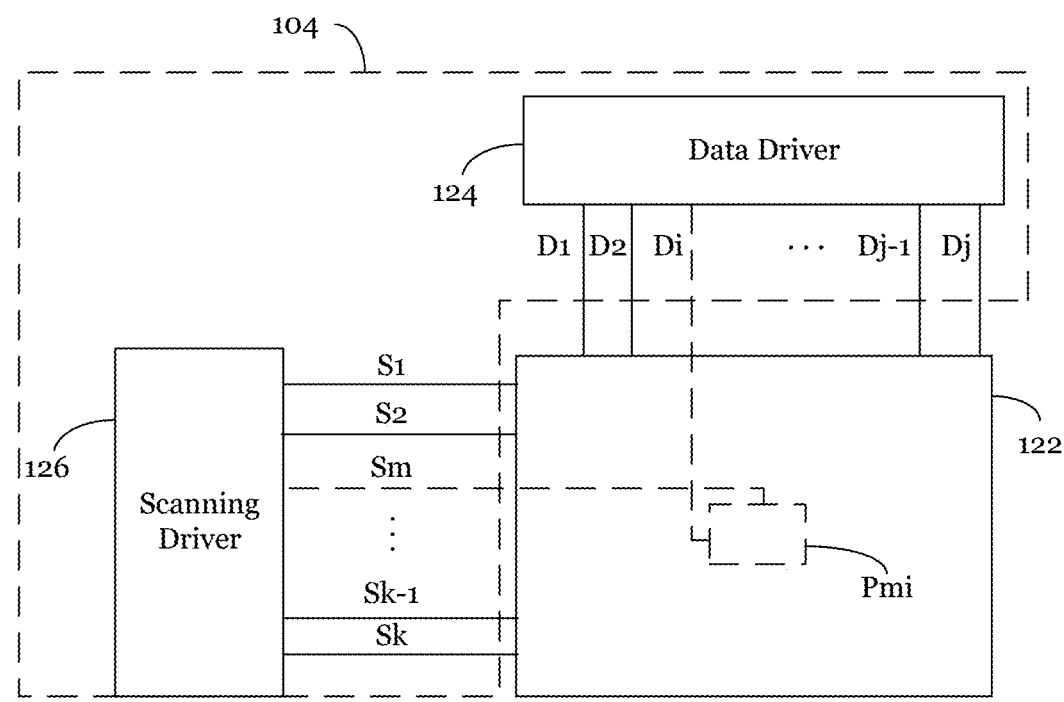
Figure 1E:
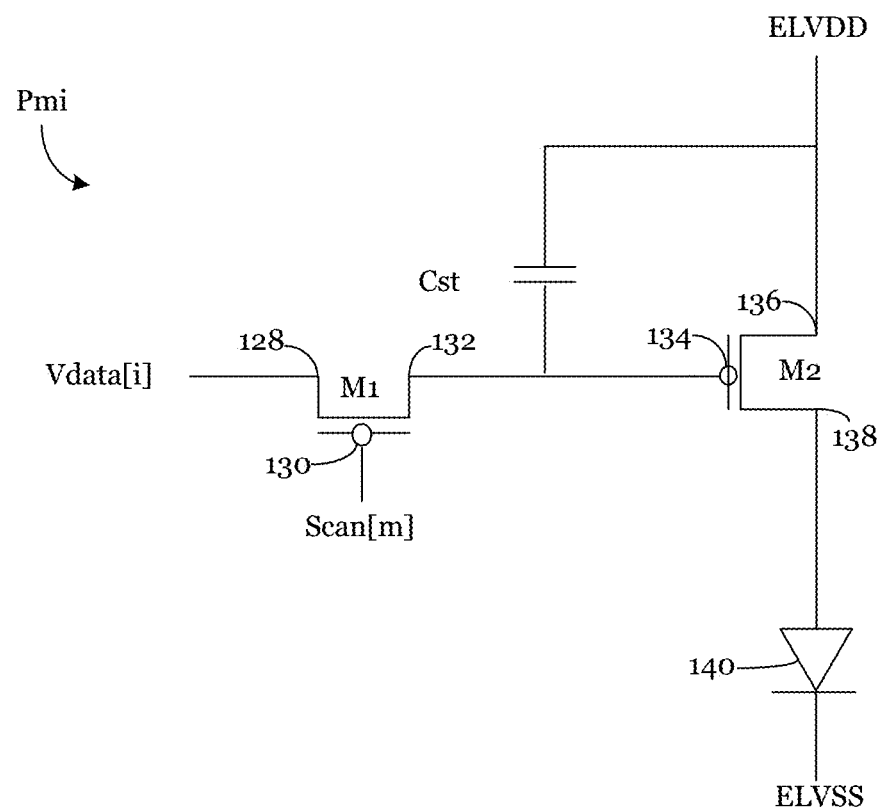
Figure 1F:
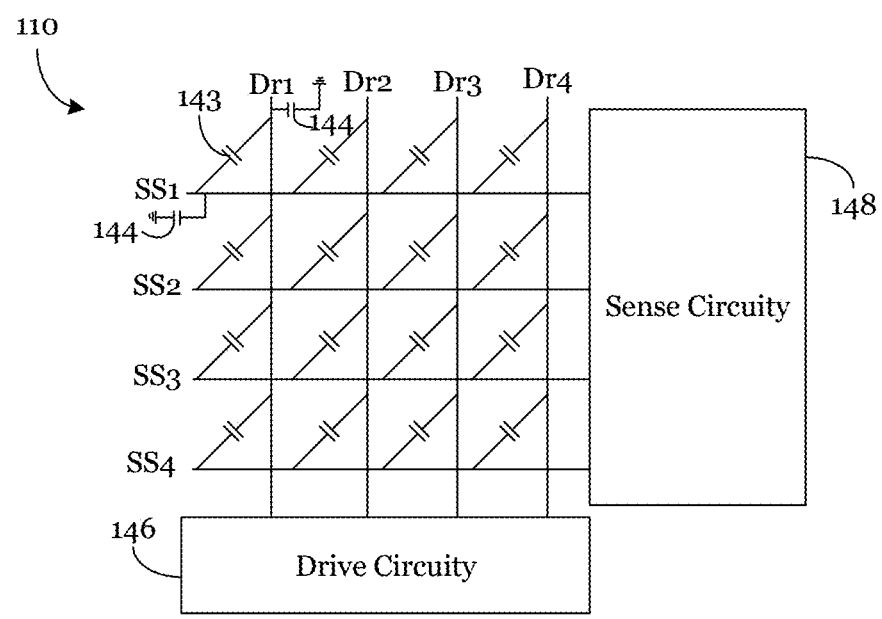

FIGS. 1A-1F illustrate an electronic device configured to prevent display flicker according to an embodiment of the present application, wherein FIG. 1A illustrates a component schematic of the electronic device, FIG. 1B illustrates a component schematic of a touchscreen, FIG. 1C illustrates a component schematic of a display stack up of the touchscreen, FIG. 1D illustrates a schematic of an OLED layer of the touchscreen, FIG. 1E illustrates a schematic of an example pixel driving circuit of the OLED layer, and FIG. 1F illustrates a component schematic of a touch sensitive layer of the electronic device.

Referring to FIG. 1A, an electronic device 100 may include a controller 104, a touchscreen 106, and a system on a chip 108. The electronic device 100 may be a smart phone, a GPS device, a tablet computer, a mobile media player, a laptop, a gaming system, a personal computer, or any other electronic device that may utilize a touchscreen 106.

The touchscreen 106 may be an organic light emitting diode (OLED) display, an LED display, or any other type of display. In various embodiments, the touchscreen 106, may be flexible and/or foldable. The touchscreen 106 may include a plurality of pixels in a display layer 112 configured to display an image. The display layer 112 of the touchscreen 106 may include a plurality of scan lines that extend across the rows of the touchscreen 106, and data lines that extend across the columns of the touchscreen 106. The scan lines and the data lines may be connected to each of the pixels. In other words, each of the plurality of pixels may be positioned at each of the intersections between the data lines and scan lines. The touchscreen 106 may also include a touch sensing layer configured to detect touches made on the touchscreen 106. This will be shown in more detail below.

The controller 104 may perform various methods with respect to the touchscreen 106. In various embodiments, the controller 104 may be a display driver IC (DDI) which may include a processor that analyzes information and carries out a series of executable scripts, e.g., stored in the memory integrated into the system on a chip 108. In one or more embodiments, the processor may comprise an application-specific integrated circuit (ASIC) device, a central processing unit (CPU), or any other processing unit known in the art. In various embodiments, the controller 104 may comprise a number of separate computing units such as cores integrated within one processor, or distinct separate processing chips.

In various embodiments, the system on a chip 108, may also be known as an application processor, and may comprise a processor, interface, circuitry, and/or the like configured to direct the flow of input and output data to the touchscreen 106 and the associated controller 104. A memory may be integrated onto the system on a chip 108. The memory may be programmed for short term and/or long term memory storage. The memory may comprise various programs to be executed in the controller 104. The memory may include both volatile and non-volatile memories. The memory is designed to retain information generated by the controller 104 so it can be recalled at a later time.

The system on a chip 108 may be configured to transmit image data and synchronization signals to the controller 104. The system on a chip 108 may also be configured to receive a synchronization signal, such as a tearing effect (TE) signal from the controller 104 sent in response to the synchronization signals it transmits.

In various embodiments, the image data may be a video signal configured to be displayed on the touchscreen 106. The video signal may be in the red, green, blue color space (RGB) or any other color space known in the art.

In various embodiments, the synchronization signals transmitted by the system on a chip 108 may include a horizontal synchronization signal (Hsync) and a vertical synchronization signal (Vsync). The controller 104 may receive the image data and transmit processed image data to the pixels on the touchscreen 106 based on Hsync and update the image displayed on the touchscreen 106 based on Vsync.

In other words, the controller 104 may convert the image into data signals in the form of analog voltages, hold the data signals, and transmit the data signals to each of the plurality of data lines based on the synchronization signals transmitted by the system on a chip 108. Similarly, the controller 104 may generate and sequentially transmit scan signals to the plurality of scan lines based on the synchronization signals transmitted by the system on a chip 108. The controller 104 may be configured to transmit the TE signal to the system on a chip 108 to indicate blank time. The blank time may be used by the controller 104 to prevent screen tearing. During the blank time, the controller 104 may receive the image data from the system on a chip 108 and process and prepare image data before updating the touchscreen 106.

Additionally, the controller 104 may be configured to detect touches on the touchscreen 106 via a touch sensing layer. In other words, the controller 104 may be configured to send touch driving signals (TDS) to the touchscreen, receive touch sensing signals (TSS) in return from the touchscreen 106, process the TSS to determine coordinates of touch, and report them to the system on a chip 108. Then based on the touch data collected from scanning, the touchscreen 106 may be used by the controller 104 to determine the coordinates of touch, and report them to the system on a chip 108. Then, the system on a chip 108 may provide an output to the touchscreen 106 based on the reported coordinates of touch.

Alternatively, a separate touchscreen controller may be used to detect touches made to the touchscreen 106.

FIG. 1B illustrates a schematic of the touchscreen 106. In various embodiments, the touchscreen 106 may include a touch sensing layer 110 and a display layer 112. The touch sensing layer 110 and the display layer 112 may be situated on the front facing side of the electronic device 100.

FIG. 1C illustrates a display stack-up of the touchscreen 106. The display stack-up of the touchscreen 106 may include a plurality of layers. In various embodiments the touchscreen 106 may comprise a cover film 114, the touch sensing layer 110, a core 118, an encapsulation film 120, and an OLED layer 122.

The OLED layer 122 may comprise a plurality of OLED elements formed across rows and columns of the touchscreen in a matrix like formation. The OLED elements may be configured to transmit light having a color (such as red, green, or blue) with a brightness based on the current they are driven with. The OLED layer will be explained in more detail below.

The encapsulation film 120 may be formed and in direct contact with the OLED layer. The encapsulation film 120 may function to prevent oxygen, water, or moisture from external sources reaching into and damaging the OLED layer. The encapsulation film may comprise one or more layers of material. For example the encapsulating film may comprise silicon dioxide, silicon nitride, or any other encapsulation films known in the art.

A core 118 may be formed over the encapsulation film 120. The core 118 may be used for controlling the characteristics of the touchscreen 106 such as external light reflection, color accuracy, luminance, and so on. For example, the core 118 may include multiple layers such as a reflection control layer that includes color filters, a lens layer corresponding to each OLED element of the OLED layer, and the like;

The touch sensing layer 110 may be formed over the core 118. The touch sensing layer 110 may be a capacitive touch panel configured to detect touches made to the touchscreen 106. This will be explained in more detail below.

The cover film 114 may be a protective layer to protect the touch sensing layer 110. The cover film 114 may comprise a transparent material such as a thin layer of glass including silicon dioxide.

The display stack-up of the touchscreen 106 described in FIG. 1C is for example purposes only and is not limited by this application. Additional layers known in the art may also be included in the display stack up of the touchscreen 106.

FIG. 1D, illustrates a schematic of the OLED layer 122 of the touchscreen according to an embodiment of the present application.

Referring to FIG. 1D, the OLED layer 122 of the touchscreen 106 may include a plurality of pixel circuits Px that are each connected to a plurality of scan lines S1-Sk and a plurality of data lines D1-Dj. The plurality of scan lines S1-Sk may be coupled to a scanning driver 126 and the plurality of data lines D1-Dj may be coupled to the data driver 124. The scanning driver 126 and the data driver 124 may be included in the controller 104. The scan lines S1-Sk may be formed in rows across the OLED layer 122 while the data lines D1-Dj are formed in columns across the OLED layer 122.

Each of the scan lines S1-Sk and each of the data lines D1-Dj may be coupled to a plurality of pixel circuits Px that are arranged in a matrix across the OLED layer 122 of the touchscreen 106. The scan lines S1-Sk may be configured to transmit scan signals Scan[1]-Scan[k] generated by the scanning driver 126 of the controller 104 and the data lines D1-Dj may be configured to transmit data signals Vdata[1]-Vdata[j] generated by the data driver 124 of the controller 104 to each of the pixel circuits Px. Although FIG. 1D illustrates a single pixel circuit Pmi, formed at the intersection of scan line Sm and data line Di this is for example purposes only.

The plurality of scan signals Scan[1]-Scan[k] may be configured to supply a turn-on voltage to a switching transistor in each of the pixel circuits Px. The data signals Vdata[1]-Vdata[j] may be configured to transmit image data to each of the pixel circuits Px. The scan signals and the data signals may be analog voltages generated by the controller 104 based on the image data transmitted from the system on a chip 108.

Each pixel circuit Px may include an organic light emitting diode (OLED). The OLED may be configured to emit light with a brightness based on a current flowing through it. An example pixel circuit Pmi will be illustrated in FIG. 1E below.

As understood by those with ordinary skill in the art, the image displayed by the touchscreen 106 may be updated in each of a plurality of display frames. In various embodiments, the controller 104 may update (refresh) the touchscreen 106 according to the vertical synchronization signal (Vsync). In other words, Vsync may be transmitted once in each display frame. The frequency of Vsync may be determined based on the refresh rate of the touchscreen 106. For example the frequency of Vsync may be 30 Hz, 60 Hz, 120 Hz, 240 Hz, and so on.

When the system on a chip 108 transmits Vsync, using the scanning driver 126, the controller 104 may be configured to sequentially transmit the plurality of scan signals Scan[1]-Scan[k] via each of the corresponding scan lines S1-Sk. The scan signals Scan[1]-Scan[k] may be control voltages transmitted sequentially to the gates of the switching transistor of the pixel circuits Px that may be transmitted during the duration of time that Vsync is transmitted.

Data may be transmitted to pixel circuits according to the horizontal synchronization signal (Hsync). In other words, the data signals Vdata[1]-Vdata[j] may be transmitted when Hsync is transmitted. When Hsync is transmitted to the controller 104, using the data driver 124, the controller 104 may be configured to transmit data signals Vdata[1]-Vdata[j] via each of the corresponding data lines D1-Dj. The frequency of Hsync may be determined based on the resolution of the touchscreen 106 and may be greater than the frequency of Vsync. For example the frequency of Hsync may be 60 Hz, 120, Hz, 240 Hz, 480 Hz, 720 Hz, and so on.

In other words data is transmitted to each of the pixel circuits based on Hsync and the touchscreen is updated (i.e. refreshed) in accordance with Vsync.

On the other hand, and as described above, the tearing effect (TE) signal may inform the system on a chip 108 a blank period of time in which the controller 104 may not send image data to the touchscreen 106 to prevent screen tearing. The TE signal may be determined by the controller 104 based on the duration and frequency of Hsync and Vsync. In other words, the TE signal may indicate blank time to the system on a chip 108 that may be used by the controller 104 to receive and process image data before updating the touchscreen 106. When the TE signal is transmitted, the system on a chip 108 may transit image data to the controller 104 and the controller 104 may process and prepare the signals to be transmitted to the pixels. During the time period over which the TE signal is being transmitted by the controller 104, the controller 104 may not send data signals Vdata[1]-Vdata[j] to the touchscreen 106 for display.

FIG. 1E illustrates a circuit diagram of a pixel circuit of a touchscreen of an electronic device according to an embodiment of the present application.

Referring to FIG. 1E, a pixel circuit of the touchscreen 106, such as Pmi for example, may include an OLED 140, a switching transistor M1, a driving transistor M2, and a storage capacitor Cst.

Although the pixel circuit Pmi of the touchscreen 106 is illustrated with a single switching transistor M1, driving transistor M2, and storage capacitor Cst this is for example purposes only. In other words the pixel circuit Pmi of the touchscreen 106 is not limited to the configuration described in FIG. 1D.

In various embodiments, the switching transistor M1 and the driving transistor M2 may be thin film transistors (TFTs). The switching transistor M1 may comprise a gate electrode 130, a first electrode 128, and a second electrode 132. The gate electrode 130 of the switching transistor M1 may be connected to one of a plurality of scan lines and be configured to receive a scan signal such as Scan[m] for example. The first electrode 128 may be coupled to one of a plurality of data lines and may be configured to receive a data signal such as Vdata[i]. The second electrode 132 of the switching transistor M1 may be coupled to the gate electrode 134 of the driving transistor M2.

The driving transistor M2 may comprise a gate electrode 134, a first electrode 136, and a second electrode 138. The gate electrode 134 of the driving transistor M2 may be coupled to the second electrode 132 of the switching transistor M1. The first electrode 136 of the driving transistor M2 may be coupled to a first power supply voltage ELVDD. The second electrode 138 of the driving transistor M2 may be coupled to an anode of the OLED 140.

The storage capacitor Cst may include one electrode coupled to the first power supply source ELVDD and another electrode coupled to the gate of the driving transistor M2. The storage capacitor Cst may be configured to charge the data voltage Vdata[i] supplied by data line Di that is supplied to the gate electrode 134 of the driving transistor M2 and maintains said charge even when the switching transistor M1 is off.

The OLED 140 has an anode connected to the second electrode 138 of the driving transistor M2 and a cathode coupled to a second power supply ELVSS. The OLED 140 may be configured to emit light having a color from the set of colors. For example the set of colors may be primary colors such as red (R), green, (G), and blue (B).

The switching transistor M1 and the driving transistor M2 may be p-type transistors. When the transistor are p-type transistors, a low level (e.g., negative) voltage turns both transistors on and a high level (e.g., positive) voltage turns both transistors off.

Although the switching transistor M1 and the driving transistor M2 are illustrated as p-type driving transistors this is for example purposes. In other words, switching transistor M1 and the driving transistor M2 may be n-type transistors. In this case a low level voltage turns both transistors off and a high level voltage turns both transistors on.

In operation when a turn on voltage (Scan signal), such as Scan[m], is supplied by the controller 104 and transmitted via scan line Sm, the switching transistor M1 may be turned on while the storage capacitor Cst is being charged while data signal Vdata[i] is being supplied to the second electrode of storage capacitor Cst. Concurrently, the driving transistor M2 controls the current draw from the first power supply voltage ELVDD to the anode of the OLED 140 so that it corresponds to the voltage charged at the storage capacitor Cst. The current flowing from the first power supply voltage ELVDD may flow to the OLED 140 and the OLED 140 may generate light with a brightness corresponding to the current flow through the driving transistor M2. The color of the light generated by the OLED 140 may be determined by the amount of charges stored in the storage capacitor Cst.

FIG. 1F illustrates a schematic of the touch sensing layer 110. In various embodiments, the touch sensing layer 110 may comprise drive lines Dr1-Dr4 and sense lines SS1-SS4 that span the entirety of the touchscreen 106 in a grid-like fashion that are operable by the controller 104. In various embodiments, the drive lines Dr1-Dr4 may be formed in rows across the touchscreen 106 and the sense lines SS1-SS4 may be formed in columns across the touchscreen 106. In other embodiments, the drive lines Dr1-Dr4 may be formed in columns across the touchscreen 106 and sense lines SS1-SS4 may be formed in columns across the touchscreen 106. In various embodiments, the number of drive lines may be equal to the number of sense lines. Although four drive lines and four sense lines are illustrated in FIG. 1F, this is not indicative of the number of drive and sense lines that may be present on the touch sensing layer. The number of drive and sense lines used are not limited by this application.

The drive lines Dr1-Dr4 and the sense lines SS1-SS4 may overlap in certain embodiments. While FIG. 1F depicts the drive lines Dr1-Dr4 and the sense lines SS1-SS4 overlapping in an orthogonal manner, they may overlap other than orthogonally such as being interleaved or at various angles.

The drive lines Dr1-Dr4 and the sense lines SS1-SS4 may have a measurable mutual capacitance at their intersections as to form a matrix of mutual capacitors with mutual capacitances 143.

In various embodiments, the drive lines Dr1-Dr4 may be coupled to drive circuitry 146 and the sense lines SS1-SS4 may be coupled to sense circuitry 148 of the controller 104. Alternatively, the drive circuitry 146 and the sense circuitry 148 may be incorporated into a separate touchscreen controller. As appreciated by those with ordinary skill in the art, each of the drive lines and the sense lines may also have a self-capacitance 144 that is measurable. In other words, the drive lines Dr1-Dr4 and the sense lines SS1-SS4 are operable in mutual sensing mode and a self-sensing mode.

In the mutual sensing mode, the controller 104 may drive each row of the drive lines Dr1-Dr4 sequentially, and measure the change in the mutual capacitance 143 due to a change in a dielectric medium between a sensing line SS1-SS4 and a respective driven drive line Dr1-Dr4 using the sense circuitry 148. In various embodiments, the drive lines Dr1-Dr4 may be driven using a periodic signal such as a sine wave, a square wave, or the like.

In other words, during a mutual sensing scan, when a drive line Dr1-Dr4 is being driven, electric fields form between intersections of the drive lines Dr1-Dr4. When a capacitive object such as human fingers or a passive stylus contacts the touchscreen 106, the electric field lines going through the air between adjacent electrodes is replaced to pass through the capacitive objects. These interruptions in the electric fields cause a detectable change in the mutual capacitance 142 of the capacitors where the touches occur.

A self-sensing scan operates by measuring a change in the self-capacitance of each of the drive lines Dr1-Dr4 (or the sense lines SS1-SS4). In other words, the self-sensing scan may include driving each of the drive lines Dr1-Dr4 (or sense lines) (with a voltage) and scanning each of the drive lines Dr1-Dr4 (or sense lines). When a human finger (or another capacitive object) is brought proximate to a drive line Dr1-Dr4 (or sense line), it adds an additional self-capacitance that can be measured.

In various embodiments, the touch data gathered by the mutual sensing and/or self-sensing scans may be processed by the controller 104. In other words, the controller 104 may analyze a matrix of touch data to determine the coordinates of touch. In other words, based on the touch data collected from scanning, the touchscreen 106 may be used by the controller 104 to determine the coordinates of touch, and report them to the system on a chip 108. Then, the system on a chip 108 may provide an output to the touchscreen 106 based on the reported coordinates of touch.

The inventors of this application have identified that flicker may be induced by the current draw required by the controller 104 to detect touch on the touchscreen. In other words, the energy or current draw required for touch sensing may reduce the current flowing through the OLEDs of the pixel circuits Px. For example, the additional current draw required by touch sensing processes may reduce the current flow though OLED 140 of pixel circuit Pmi. This may result in a reduced brightness of the touchscreen 106, resulting in noticeable flicker on the touchscreen 106 by a user.

The inventors of this application have identified that the self-sensing process requires a greater current draw than the mutual sensing process, and may be responsible for the current draw that dims the brightness of the touchscreen 106. Advantageously, in order to prevent flicker caused by the high levels of additional energy (the extra current draw) required by the touchscreen 106 during a self-sensing scan, the controller 104 may perform the self-sensing scan while the tearing effect (TE) signal is transmitted. In other words, the additional current draw of the self-sensing signal may be performed during the blank period, when the pixel circuits are not being driven.

Figure 2:
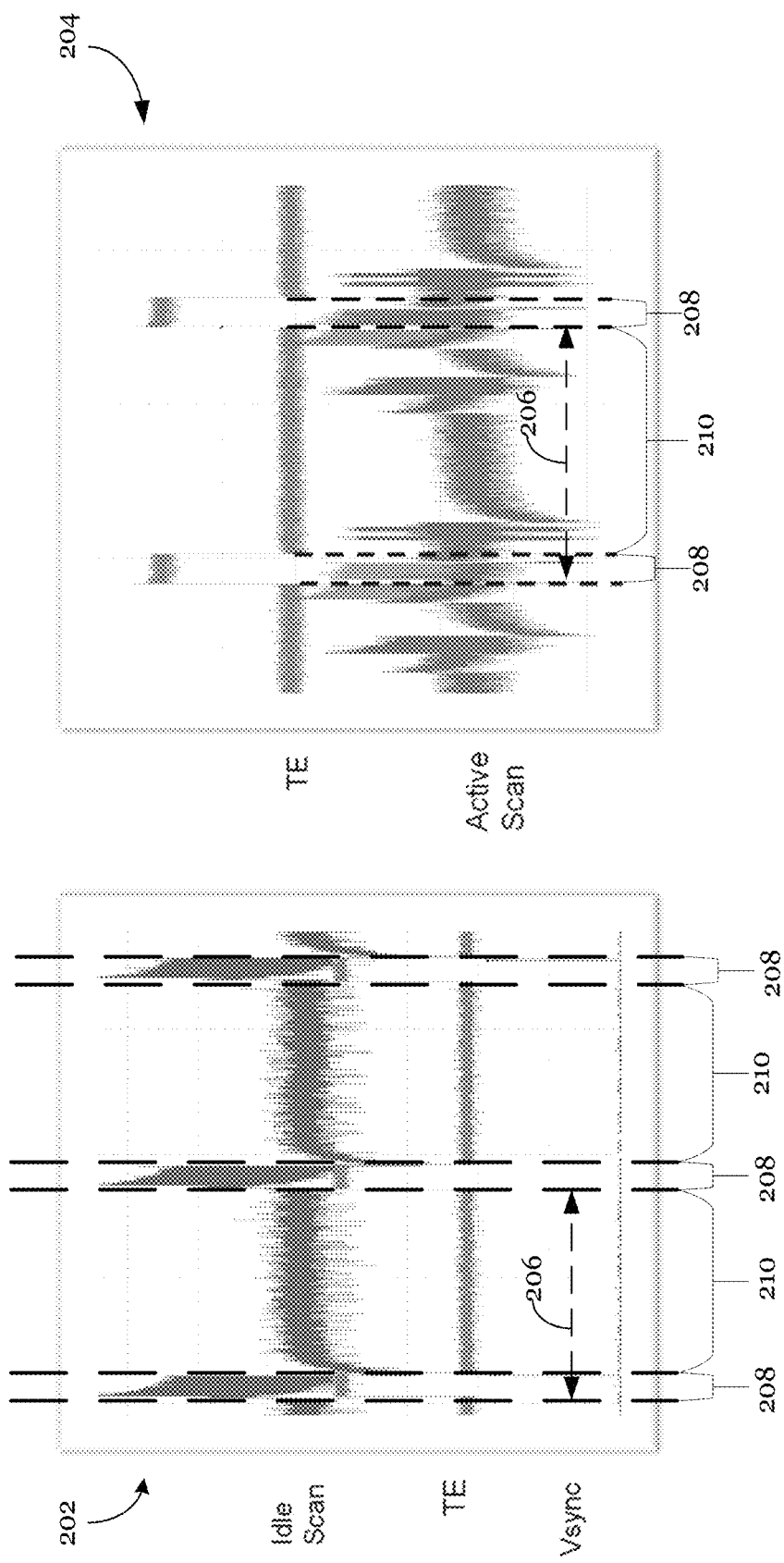
FIG. 2 illustrates a timing diagram for preventing flicker on a touchscreen according to an embodiment of the present application.
Figure 3:
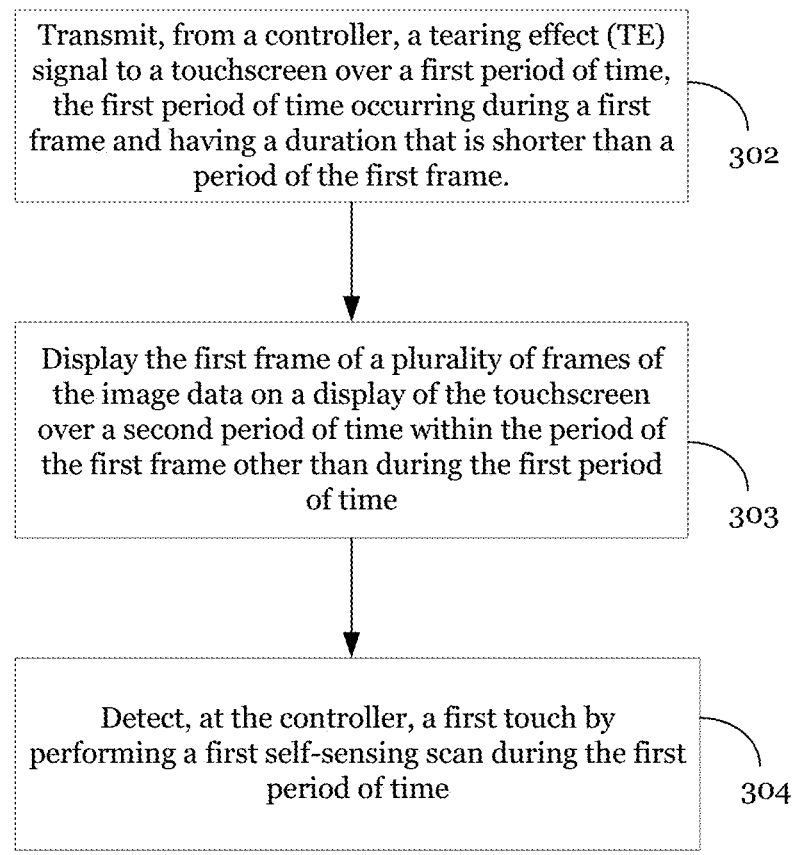
FIG. 3 illustrates the process steps of preventing display flicker on a touchscreen according to an embodiment of the present application.

FIG. 2 illustrates a timing diagram for preventing flicker on a touchscreen according to an embodiment of the present application. FIG. 3 illustrates the process steps of preventing display flicker on a touchscreen according to an embodiment of the present application.

Referring to FIG. 2 a first timing diagram 202 and a second timing diagram 204 illustrate the energy required (e.g. the current drawn) by the touchscreen 106 with respect to time for an idle scan or an active scan.

Referring to FIG. 2, the controller 104 may transmit a tearing effect signal (TE) signal in a first display frame 206 over a first period of time 208 (block 302). As described above, the frequency of the first display frame 206 may be determined by the controller 104 and may be equal to the frequency of the TE signal. In other words, the TE signal may be transmitted at the beginning of each display frame during operation of the electronic device 100, and have a duration (e.g. width) shorter than the duration of the first display frame 206. The first period of time 208 may be a period of blank time in which the controller 104 is restricted from sending processed image data to each of the OLEDs in each pixel circuit Px. For example when the TE signal is transmitted to the SoC, the controller 104 may not send data signal Vdata[i] to pixel circuit Pmi. Each display frame (such as the first display frame 206) may be divided into the first period of time 208, which corresponds to the period of blank time, and a second period of time 210 that occurs between transmissions of the TE signals.

In various embodiments, during the second period of time 210, the display frame of the image data (such as the first display frame 206) may be displayed on the display layer 112 of the touchscreen 106 (block 303). In other words after the first period of time 208 and during the second period of time 210, the controller 104 may send processed image data (i.e. Vdata[1]-Vdata[j]) to each of the pixel circuits Px. For example during the second period of time 210, the controller 104 may transmit Vdata[i] to pixel circuit Pmi.

In various embodiments, because image data is not being displayed by the touchscreen 106 during the first period of time 208, a self-sensing scan may advantageously be performed during the first period of time 208 (block 304). One advantage of this is that the brightness of the touchscreen 106 is not brought down by the current draw required for the self-sensing scan because the additional current draw is occurring while the pixel circuits are not being driven. Therefore, the TE signal may be configured to ensure that the first period of time 208 is long enough that a self-sensing scan may be performed during it.

In other words, referring back to the first timing diagram 202 and the second timing diagram 204, the scan energies reaches their peaks during the first period of time 208. Advantageously, as described above this may prevent screen flicker by ensuring the extra current draw for the self-sensing scan does not dim the touchscreen 106.

In various embodiments, because a mutual sensing scan does not require as large of a current draw and the TE signal duration may not be long enough for both sensing scans, the controller 104 may perform a mutual sensing scan after the first period of time 208 but within the first display frame 206 (and each of the display frames). In other words, a mutual sensing scan may be performed in each display frame during the second period of time 210.

The inventors of this application have also identified that the energy required for communication with an active stylus pen and the touchscreen 106 may also draw enough current from the touchscreen 106 to induce flicker. Specifically the current draw required to transmit a pen sensing uplink signal may induce flicker.

FIG. 4 illustrates a timing diagram for preventing flicker on a touchscreen for a touchscreen in communication with an active stylus pen according to an embodiment of the present application.

Referring to FIG. 4, during the first period of time 208 a pen sensing uplink signal 402 for communication with an active stylus pen may be transmitted by the controller 104 via the drive lines of the touchscreen 106. In other words, the pen sensing uplink signal 402 may be transmitted to an active stylus pen during the blank period of time.

In various embodiments, the pen sensing uplink signal 402 may be transmitted and the self-sensing scan may be performed during the first period of time 208. Therefore, the duration of the first period of time 208 may be configured to be long enough for both the self-sensing scan and the transmitting of the pen sensing uplink signal 402.

In various embodiments, the pen sensing uplink signal 402 and the driving signal required for the self-sensing scan may be time multiplexed during the first period of time 208. For example, if the first period of time 208 occurs over a duration of 10 ms, 9 ms may be allocated to the self-sensing scan and 1 ms may be used to transmit the pen uplink signal. In various embodiments, the self-sensing scan may be performed prior to the transmitting of the pen sensing uplink signal.

Then during the second period of time 210, the controller 104 may be configured to perform a sensing operation via the sensing lines of the touchscreen 106 to sense a pen sensing downlink signal 404 transmitted by the active stylus pen in response to the pen sensing uplink signal 402 and determine coordinates of touch by the active stylus pen.

In various embodiments, the controller 104 may be configured to perform a mutual sensing scan and sense the pen sensing downlink signal 404 during the second period of time 210. In this case, the mutual sensing scan may be performed after the pen sensing downlink signal 404 because, as understood by those with ordinary skill in the art, the pen sensing downlink signal may be transmitted immediately in response to the pen sensing uplink signal 402.

Embodiments of the present application embody a practical application for operating an OLED touchscreen, e.g., for preventing display flicker, which can be implemented directly in the software of the electronic device 100. Advantageously this allows for a significant technological improvement in OLED touchscreens because conventional OLED touchscreens reduce flicker but do not prevent it.

Example embodiments of the invention are summarized here. Other embodiments can also be understood from the entirety of the specification as well as the claims filed herein.

Example 1. A method for operating an electronic device includes transmitting, from a controller, a tearing effect (TE) signal to a touchscreen over a first period of time, the first period of time occurring during a first frame and having a duration that is shorter than a period of the first frame, the TE signal being configured to restrict image data from being displayed on the touchscreen during the first period of time; displaying the first frame of a plurality of frames of the image data on a display of the touchscreen over a second period of time within the period of the first frame other than during the first period of time; and detecting, at the controller, a first touch by performing a first self-sensing scan during the first period of time.

Example 2. The method of example 1, further including: transmitting the TE signal in a second frame over a third period of time, the third period of time being equal to the first period of time; and detecting a second touch by performing a second self-sensing scan during the third period of time.

Example 3. The method of one of examples 1 or 2, further including detecting a second touch by performing a mutual sensing scan in the first frame and after the first period of time.

Example 4. The method of one of examples 1 to 3, further including transmitting a pen uplink signal to an active stylus pen during the first period of time.

Example 5. The method of one of examples 1 to 4, further including sensing a pen downlink signal transmitted by the active stylus pen in response to the pen uplink signal during the first frame and after the first period of time.

Example 6. The method of one of examples 1 to 5, where the transmitting of the pen uplink signal and the performing of the self-sensing scan are time multiplexed during the first period of time.

Example 7. The method of one of examples 1 to 6, where the transmitting of the TE signal over the first period of time and the detecting of a first touch by performing the self-sensing scan during the first period of time are performed by a touchscreen controller.

Example 8. The method of one of examples 1 to 7, where the touchscreen is a flexible OLED touchscreen.

Example 9. A method for operating an electronic device includes: generating a blank period of time in which a touchscreen is restricted from displaying an image in each of a plurality of frames, the blank period of time being shorter than a period of each of the plurality of frames; performing a vertical synchronization of the touchscreen during the blank period of time; and displaying an image in each of the plurality of frames, a brightness of the image in each of the plurality of frames before and during the blank period of time being maintained by restricting a time duration for additional current draw for a self sensing-scan to fall within the blank period of time.

Example 10. The method of example 9, where generating the blank period of time includes transmitting a tearing effect (TE) signal.

Example 11. The method of one of examples 9 or 10, where the blank period of time distinguishes each of the plurality of frames.

Example 12. The method of one of examples 9 to 11, further including transmitting a pen sensing uplink signal to an active stylus pen during the blank period of time in each of the plurality of frames.

Example 13. The method of one of examples 9 to 12, further including sensing a pen downlink signal transmitted by the active stylus pen in response to the pen sensing uplink signal in each of the plurality of frames and after the blank period of time.

Example 14. The method of one of examples 9 to 13, further including performing a mutual sensing scan after the blank period of time in each of the plurality of frames.

Example 15. A device includes: a touchscreen; a controller; a memory for storing a program to be executed in the controller, the program including instructions when executed cause the controller to: transmit a tearing effect (TE) signal from the controller to the touchscreen over a first period of time, the first period of time occurring during a first frame and having a duration that is shorter than a period of the first frame, the TE signal being configured to restrict image data from being displayed on the touchscreen during the first period of time; display the first frame of a plurality of frames of the image data on a display of the touchscreen over a second period of time within the period of the first frame other than during the first period of time; and detect a first touch by performing a first self-sensing scan during the first period of time.

Example 16. The device of example 15, where the program further includes instructions to: transmit the TE signal in a second frame over a third period of time, the third period of time being equal to the first period of time; and detect a second touch by performing a second self-sensing scan during the third period of time.

Example 17. The device of one of examples 15 or 16, where the instructions further include instructions to detect a second touch by performing a mutual sensing scan in the first frame and after the first period of time.

Example 18. The device of one of examples 15 to 17, where the instructions further include instructions to transmit a pen uplink signal to an active stylus pen during the first period of time.

Example 19. The device of one of examples 15 to 18, where the instructions further include instructions to sense a pen downlink signal transmitted by the active stylus pen in response to the pen uplink signal during the first frame and after the first period of time.

Example 20. The device of one of examples 15 to 19, where the transmitting of the pen uplink signal and the performing of the self-sensing scan are time multiplexed during the first period of time.

Example 21. The device of one of examples 15 to 20, where the touchscreen is a flexible OLED touchscreen.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating an electronic device, the method comprising:
generating a blank period of time in which a touchscreen is restricted from displaying an image in each of a plurality of frames, the blank period of time being shorter than a period of each of the plurality of frames;

performing a vertical synchronization of the touchscreen during the blank period of time; and displaying the image in each of the plurality of frames, a brightness of the image displayed in each of the plurality of frames before and during the blank period of time being maintained by restricting a time duration for additional current draw for a self-sensing scan to fall within the blank period of time.

2. The method of claim 1, wherein generating the blank period of time comprises transmitting a tearing effect (TE) signal.

3. The method of claim 2, wherein the blank period of time distinguishes each of the plurality of frames.

4. The method of claim 1, further comprising transmitting a pen sensing uplink signal to an active stylus pen during the blank period of time in each of the plurality of frames.

5. The method of claim 4, further comprising sensing a pen downlink signal transmitted by the active stylus pen in response to the pen sensing uplink signal in each of the plurality of frames and after the blank period of time.

6. The method of claim 1, further comprising performing a mutual sensing scan after the blank period of time in each of the plurality of frames.

7. The method of claim 1, wherein the touchscreen is a flexible Organic Light-Emitting Diode (OLED) touchscreen.

8. A device comprising:
a touchscreen;
a controller; and
a memory for storing a program to be executed by the controller, the program comprising instructions that, when executed, cause the controller to:
generate a blank period of time in which the touchscreen is restricted from displaying an image in each of a plurality of frames, the blank period of time being shorter than a period of each of the plurality of frames,
perform a vertical synchronization of the touchscreen during the blank period of time, and
display the image in each of the plurality of frames, a brightness of the image displayed in each of the plurality of frames before and during the blank period of time being maintained by restricting a time duration for additional current draw for a self-sensing scan to fall within the blank period of time.

9. The device of claim 8, wherein generating the blank period of time comprises transmitting a tearing effect (TE) signal.

10. The device of claim 9, wherein the blank period of time distinguishes each of the plurality of frames.

11. The device of claim 8, wherein the instructions, when executed, cause the controller to transmit a pen sensing uplink signal to an active stylus pen during the blank period of time in each of the plurality of frames.

12. The device of claim 11, wherein the instructions, when executed, cause the controller to sense a pen downlink signal transmitted by the active stylus pen in response to the pen sensing uplink signal in each of the plurality of frames and after the blank period of time.

13. The device of claim 8, wherein the instructions, when executed, cause the controller to perform a mutual sensing scan after the blank period of time in each of the plurality of frames.

14. The device of claim 8, wherein the touchscreen is a flexible Organic Light-Emitting Diode (OLED) touchscreen.

15. A controller configured to:
generate a blank period of time in which a touchscreen is restricted from displaying an image in each of a plurality of frames, the blank period of time being shorter than a period of each of the plurality of frames;
perform a vertical synchronization of the touchscreen during the blank period of time; and
display the image in each of the plurality of frames, a brightness of the image displayed in each of the plurality of frames before and during the blank period of time being maintained by restricting a time duration for additional current draw for a self-sensing scan to fall within the blank period of time.

16. The controller of claim 15, wherein generating the blank period of time comprises transmitting a tearing effect (TE) signal.

17. The controller of claim 16, wherein the blank period of time distinguishes each of the plurality of frames.

18. The controller of claim 15, wherein the controller is configured to transmit a pen sensing uplink signal to an active stylus pen during the blank period of time in each of the plurality of frames.

19. The controller of claim 18, wherein the controller is configured to sense a pen downlink signal transmitted by the active stylus pen in response to the pen sensing uplink signal in each of the plurality of frames and after the blank period of time.

20. The controller of claim 15, wherein the controller is configured to perform a mutual sensing scan after the blank period of time in each of the plurality of frames.

* * * * *